Patented Mar. 30, 1937

2,075,253

UNITED STATES PATENT OFFICE 2,075,253

HYDROHALOGENATED VULCANIZED BUTADIENE BODIES

Herbert A. Winkelmann and Eugene W. Moffett, Chicago, Ill., assignors to Marbon Corporation, a corporation of Delaware No Drawing. Application May 10, 1935, Serial No. 20,897

3 Claims. (Cl. 106—23)

This invention relates to thermoplastic butadiene derivatives. More particularly it relates to bodies obtained by the reaction of liquefied hydrogen chloride with vulcanized rubber, including vulcanized scrap rubber and reclaimed rubber. The invention also includes the preparation of molded masses and sheets from the reaction products.

Vulcanized rubber is available in large quantities in the form of scrap rubber and reclaimed rubber. Rubber scrap consists largely of vulcanized rubber compositions and includes such material as inner tube scrap, old tire scrap, tread peelings, hose scrap, boot and shoe scrap and the like. These may contain any of the ingredients commonly mixed with rubber such as accelerators, age retarders, anti-oxidants, inorganic fillers including pigments and fabric or other cellulose materials. Reclaimed rubber is scrap rubber which has been treated in various ways to plasticize it and make it suitable for the manufacture of new goods. Part of the free sulfur and pigments may be removed but the rubber obtained by any of the reclaiming processes is not crude rubber, but a softened vulcanized rubber of about the same degree of vulcanization as the original scrap.

It is an object of this invention to produce commercially useful thermoplastic derivatives from vulcanized butadiene bodies, and particularly from rubber scrap and reclaimed rubber.

It is a further object of this invention to produce a moldable composition therefrom with high tensile strength, and good resistance to alkalis and oils.

Another object is to produce intimate mixtures of vulcanized rubber and rubber hydrochlorides quickly and economically.

Other and further objects will become apparent from reading the specification.

In the present invention vulcanized rubber, in the form of scrap or otherwise, is reacted with liquefied hydrogen halide, in particular with liquefied hydrogen chloride.

The great advantage in the use of liquefied hydrogen chloride is that it makes possible the preparation of hydrogen chloride vulcanized rubber reaction products without dissolving the vulcanized rubber which, especially when compounded with sulfur and fillers as in scrap rubber, is insoluble in the usual rubber solvents at ordinary temperatures, and when dissolved in special solvents or at high temperatures is so disaggregated that the composition obtained on evaporation of the solvent is different from the original. With liquefied hydrogen chloride the hydrogen chloride diffuses into the vulcanized rubber quickly, the time depending largely on the thickness of the rubber masses. On complete penetration of the vulcanized rubber mass by the hydrogen chloride a hydrochlorinated product is obtained which has good solvent and oil resistance and great strength and inherent flexibility. Its exact composition is unknown, but it is believed to be composed primarily of an amorphous asymmetrical rubber hydrochloride chemically or physically combined with sulfur and intimately admixed with unreacted upon vulcanized rubber. The composition, however, differs from the product obtained by reacting rubber alone with liquefied hydrogen chloride at low temperatures in that it is very insoluble in benzol, carbon tetrachloride and other materials which readily dissolve the former product. The solubility is similar to that of the product before it has been reacted with hydrogen chloride.

As an example of the procedure, the following is given, scrap inner tubes having the following approximate composition in parts by weight: rubber 70, zinc oxide 5, blanc fixe 16, iron oxide 3, accelerator 1, sulfur (combined) 2, sulfur (free) .5, antioxidant .5 and stearic acid 2 are made into strips of approximately .05" in diameter and are placed in contact with liquefied hydrogen chloride at about −85° C. for one hour. On removal of the material from the liquefied hydrogen chloride it expands to about twice its volume accompanied by a series of popping noises. A portion of the product dissolves in the liquefied hydrogen chloride and is recovered by evaporation. The substantially completely reacted product has a chlorine content of approximately 23%, on the basis of the original inner tubes, and is practically insoluble in benzol, carbon tetrachloride and other solvents which readily dissolve the reaction product of crude rubber and liquefied hydrogen chloride.

As a further example of the invention, the following is given: finely powered inner tube scrap is placed in liquefied hydrogen chloride for ten minutes. The powder dissolves in the liquefied hydrogen chloride. On evaporation of the solvent hydrogen chloride a substantially completely reacted product is obtained similar to the product obtained with strips.

In place of inner tube scrap other scrap may be used. Hard or soft rubber may be used. With hard rubber, a highly vulcanized rubber, a reaction is obtained with liquefied hydrogen chloride, and an insoluble type of product obtained having a chlorine content of approximately 10%.

Likewise similar results are obtained by using reclaimed rubber made by any of the various processes known to the art.

In general reclaiming processes may be divided into four classes as follows: 1. Alkali process. 2. Heater process in which alkali may be used. 3. Acid process. 4. Digester neutral process. The reclaim made by the acid and neutral process is less plastic and less water absorbent than the reclaim made by the alkali process, especially when the reclaim of the alkali process is not thoroughly washed. Because of this, it is preferred to use an acid or neutral reclaim. However, any reclaim may be reacted with liquefied hydrogen chloride with the production of a product similar to that obtained with scrap rubber.

The scrap rubber or reclaim should preferably be in thin sheets, in a finely divided state, or in some other form in which all parts of the material are readily accessible to the hydrogen chloride.

The reaction may be allowed to go substantially to completion or may be stopped before completion. Catalysts such as tin tetrachloride disclosed in our co-pending application, Serial No. 20,896, filed May 10, 1936, may be used to obtain scrap rubber hydrochloride products of improved oil resistance. The reaction may be carried out with liquid hydrogen chloride at atmospheric pressure or with liquefied hydrogen chloride at temperatures above its boiling point and under pressure. In place of hydrogen chloride other hydrohalides may be used.

The reaction products are practically insoluble in ordinary solvents for rubber hydrochlorides and it is, therefore, preferred to mill the material with stabilizers such as magnesium oxide, calcium oxide and plasticizers such as butyl stearate, amyl benzene or similar stabilizing materials and plasticizers as described in the co-pending application of Herbert A. Winkelmann, Serial No. 11,665. The product, however, may be milled without stabilizers, with less satisfactory results. The milled material may be rolled or molded, or the reaction product calendered or molded without milling, with or without stabilizers.

Composition of high tensile strength may be made by mixing the rubber hydrochloride vulcanized rubber composition with Duprene (polymerized chloroprene). Milled mixtures of 50 parts Duprene, 50 parts scrap rubber hydrochloride, 10 parts magnesium oxide, 10 parts lead oxide by weight, result in a product which may be molded, calendered and cured to give products similar to Duprene alone. Rubber may similarly be admixed and treated.

Thin flexible sheets suitable for wrapping paper may be made by calendering the hydrogen chloride vulcanized rubber reaction product to thin sheets by means of either hot or cold rolls. The product prior to calendering or molding is preferably stabilized with magnesium oxide and milled into a homogeneous integral sheet.

By the term "vulcanized" is meant the change in rubber produced by the action of agents such as sulphur, sulphur chloride and the like materials called vulcanizing agents in the rubber art. The term includes partially vulcanized rubber.

It is to be understood that numerous details may be varied without departing from the spirit of this invention and it is, therefore, not intended to limit the patent granted herein except as necessitated by the prior art. The term "rubber" as used in the claims is intended to cover rubber and materials which may be the equivalent for the purpose desired, such as balata and gutta percha.

Instead of reacting undissolved partially vulcanized rubber with liquefied hydrogen halide it may be reacted with gaseous hydrogen halides, preferably under pressure but such a process is slower than with liquefied hydrogen halide and may not give the same product either chemically or physically.

We claim as our invention:

1. A rubber derivative composition comprising the reaction product of a liquefied hydrogen halide and vulcanized rubber, and polymerized chloroprene.

2. A molded mass comprising polymerized chloroprene and the reaction product of a hydrogen halide and vulcanized rubber.

3. A composition of matter comprising a rubber hydrochloride, a polymerized chloroprene, and sulfur.

HERBERT A. WINKELMANN.
EUGENE W. MOFFETT.